Patented Mar. 11, 1930

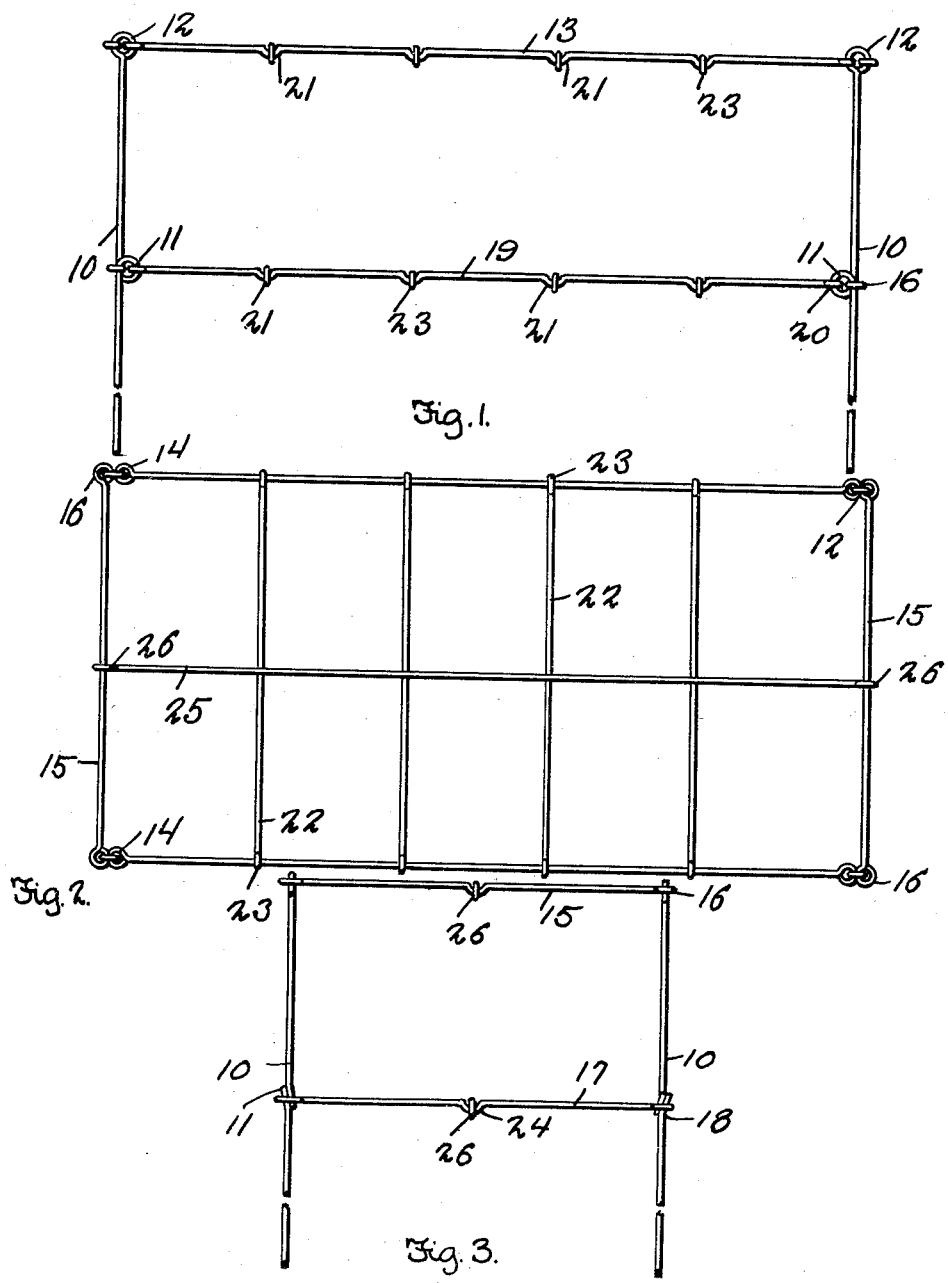

1,750,387

UNITED STATES PATENT OFFICE

JACOB J. BURKHARTZMEYER, OF ROCHESTER, NEW YORK

PLANT AND FLOWER SUPPORT

Application filed December 31, 1926. Serial No. 158,346.

The present invention relates to improvements in flower support frames and has for its primary object to provide a collapsible frame designed to be fitted in flower boxes to support the early growth of flowers.

A further object of the invention is the provision of a support frame of the above character whereby flowers and the like will be trained to grow in a straight vertical arrangement.

Another object of the invention is the provision of a frame which is simple and durable of construction, efficient for the purpose intended and which can be manufactured at a relatively low cost.

Other objects and advantages of the invention will become apparent as the description progresses.

In the accompanying drawing forming a part of this specification and in which like reference characters are employed to designate corresponding parts throughout the same:

Figure 1 is a side elevational view of my improved support,

Figure 2 is a top plan view of the same, and

Figure 3 is an end elevational view of the same.

Referring to the drawing, wherein for the purpose of illustration is shown the preferred embodiment of my invention, the numeral 10 generally designates the vertical support members embodying longitudinal wires or rods looped at the intermediate portions to form offset eyes 11 and looped at their upper ends to form eyes 12. The lower ends of the rods 10 are preferably of straight formation for convenient insertion in a flower box. The rods 10, of which there are four in number, form the corner supports of the frame. Arranged longitudinally at the upper side portions of the frame are longitudinal rods 13 disposed in a horizontal position and having their end portions looped to form connecting eyes 14. The rods 13 are arranged at each longitudinal side of the frame and the end loops 14 connect with the eyes 12 of the vertical support rods 10. The upper ends of the frame carry transversely extending rods 15 formed with eyes 16 at their ends for connection with the eyes 12 of the vertical support rods and arranged horizontally at the ends of the longitudinal rods 13. An intermediate set of transverse rods 17 are arranged horizontally and formed with eyes 18 which connect with the intermediate offset loops 11 of the support rods 10. An intermediate set of longitudinal rods 19 are also provided, these longitudinal rods being disposed below the upper longitudinal rods 13 and formed with eyes 20 at their ends for connection with the intermediate support rod loop 11.

As shown to advantage in the drawing, the intermediate portions of the upper and lower longitudinal rods 13 and 19 respectively are formed with uniformly spaced recesses or bight portions 21, embodying semi-circular offset portions engageable with the looped ends of transversely extending brace rods 22 formed with eyes 23 on their extremities engageable with the ears or recesses. The end transverse rods 15 and 17 are also formed with central recesses or bight portions 24 engageable with the ends of longitudinally extending brace rods 25 formed with eyes 26 on their ends.

This structure provides a collapsible frame which may be conveniently mounted in suitable position in a flower box so that the flowers or plants will be supported for straight vertical growth. The frame may be constructed in various sizes for use in connection with various types of flower boxes and arranged to properly support the early growth of the flowers. An important characteristic of the frame is the extreme simplicity of construction and the ability to collapse the frame into comparatively small sized articles for convenient shipment and storage.

It is to be understood that the form of my invention herewith shown and described is to be taken as the preferred example of the same and that various changes as to the shape, size and arrangement of parts may be resorted to without departing from the spirit of the invention or the scope of the subjoined claim.

Having thus described my invention, I claim:

A plant support comprising corner supporting rods, lower supporting eyes formed directly on and offset from said rods intermediate the ends thereof, upper supporting eyes formed directly on said rods at the upper terminals thereof, upper and lower sets of longitudinal and transverse connecting rods having eyes formed on the terminals thereof engaging the upper and lower eyes on said supporting rods, the connecting rods having bight portions formed therein intermediate their ends, and transverse and longitudinal cross rods having eyes formed on the terminals thereof engaging the bight portions.

In testimony whereof I affix my signature.

JACOB J. BURKHARTZMEYER.